United States Patent
Shveidel et al.

(10) Patent No.: US 10,705,965 B2
(45) Date of Patent: Jul. 7, 2020

(54) METADATA LOADING IN STORAGE SYSTEMS

(71) Applicant: EMC IP Holding Company LLC, Hopkinton, MA (US)

(72) Inventors: Vladimir Shveidel, Pardes-Hana (IL); Dror Zalstein, Givatayim (IL); Dafna Levi-Yadgar, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 16/042,406

(22) Filed: Jul. 23, 2018

(65) Prior Publication Data
US 2020/0026653 A1    Jan. 23, 2020

(51) Int. Cl.
*G06F 12/00* (2006.01)
*G06F 12/08* (2016.01)
*G06F 13/00* (2006.01)
*G06F 12/0868* (2016.01)

(52) U.S. Cl.
CPC .. *G06F 12/0868* (2013.01); *G06F 2212/1016* (2013.01); *G06F 2212/466* (2013.01)

(58) Field of Classification Search
CPC ......... G06F 3/0619; G06F 3/065; G06F 12/00
USPC ........................................................ 711/118
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 9,104,326 B2 | 8/2015 | Frank et al. |
| 9,208,162 B1 | 12/2015 | Hallak et al. |
| 9,286,003 B1 | 3/2016 | Hallak et al. |
| 9,606,870 B1 | 3/2017 | Meiri et al. |
| 9,716,754 B2 | 7/2017 | Swift |
| 2008/0279462 A1 | 11/2008 | Celi, Jr. |
| 2009/0132955 A1 | 5/2009 | Garg et al. |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Mohamed M Gebril
(74) *Attorney, Agent, or Firm* — Ryan, Mason & Lewis, LLP

(57) ABSTRACT

During a restart process in which metadata is loaded from at least one of a plurality of storage devices into a cache, a storage controller is configured to generate an IO thread in response to the receipt of an IO request, identify at least one metadata page of the metadata that is used to fulfill the IO request, and generate a loading thread in association with the received IO thread that is configured to cause the storage controller to perform prioritized loading of the identified at least one page of the metadata into the cache. The loading thread is detachable from the IO thread such that, in response to an expiration of the IO thread, the loading thread continues to cause the storage controller to perform the prioritized loading until the loading of the at least one page of the metadata into the cache is complete.

20 Claims, 9 Drawing Sheets

(56) References Cited

U.S. PATENT DOCUMENTS

| | | |
|---|---|---|
| 2010/0179941 A1 | 7/2010 | Agrawal et al. |
| 2013/0325824 A1 | 12/2013 | Shoens |
| 2014/0181016 A1 | 6/2014 | Whitehead et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2017/0192857 A1 | 7/2017 | Meiri et al. |
| 2020/0026653 A1* | 1/2020 | Shveidel ............ G06F 12/0868 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint—Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 15/196,472, filed in the name of Vladimir Shveidel et al. on Jun. 29, 2016 and entitled "Thread Management in a Storage System."

* cited by examiner

METADATA LOADING IN STORAGE SYSTEMS

FIELD

The field relates generally to information processing systems, and more particularly to storage in information processing systems.

BACKGROUND

In some storage systems, input/output (IO) request processing may have hard time constraints where a storage controller must reply to the IO request within a predetermined period of time. If the predetermined period of time expires before the IO request has been serviced, the storage controller typically sends a busy message to the host device that submitted the IO request.

During a storage system restart, metadata associated with data pages stored by the storage system may be loaded from a plurality of storage devices into a cache as part of a restart process. Often the metadata loading is performed by the storage controller using background processes which simply load the metadata into cache in a predetermined order, sometimes referred to as "Lazy Load". When an IO request is received during the restart process that requires metadata that has not yet been loaded, the storage controller typically attempts to load the metadata "on demand", i.e., contemporaneous with receipt of the IO request. However, the time that it takes to load the metadata on demand may exceed the predetermined period of time set by the hard time constraint for the IO request which results in a timeout of the IO request. Typically, on timeout of the IO request, the on demand loading of the metadata is canceled.

SUMMARY

Illustrative embodiments provide techniques for efficient loading of metadata into cache during a storage system restart process.

In one embodiment, a storage system comprises a plurality of storage devices, an associated storage controller, and an associated cache. The plurality of storage devices store data pages and metadata associated with the stored data pages. During a restart process in which the metadata is loaded from the plurality of storage devices into the cache, the storage controller is configured to generate an IO thread in response to the receipt of an IO request. The IO thread is configured to service the IO request. The storage controller is further configured to identify at least one metadata page of the metadata that is used to fulfill the IO request. During the restart process, the storage controller is further configured to generate a loading thread in association with the received IO thread. The loading thread is configured to cause the storage controller to perform prioritized loading of the identified at least one page of the metadata into the cache. The loading thread is detachable from the IO thread such that, in response to an expiration of the IO thread, the loading thread continues to cause the storage controller to perform the prioritized loading of the at least one page of the metadata into the cache until the loading of the at least one page of the metadata into the cache is complete. The storage controller comprises at least one processing device comprising a processor coupled to a memory.

In some embodiments, the metadata may be stored in the storage devices as a plurality of buckets of metadata pages. During the restart process, the storage controller may be configured to load the metadata into the cache bucket by bucket in a predetermined order and to perform the prioritized loading of the at least one page of the metadata out of order of the predetermined order.

Additionally or alternatively, causing the storage controller to perform prioritized loading of the at least one page of the metadata may comprise causing the storage controller to perform prioritized loading of the bucket containing the at least one page of the metadata.

In some embodiments, causing the storage controller to perform prioritized loading of the bucket containing the at least one page of the metadata may comprise causing the storage controller to add the bucket containing the at least one page of the metadata to a hot list of buckets where the hot list of buckets may comprise a list of buckets that have been marked for prioritized loading.

Additionally or alternatively, causing the storage controller to perform prioritized loading of the at least one page of the metadata may comprise causing the storage controller to load the at least one page of the metadata on demand and mark the bucket containing the at least one page of the metadata for further prioritized loading.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
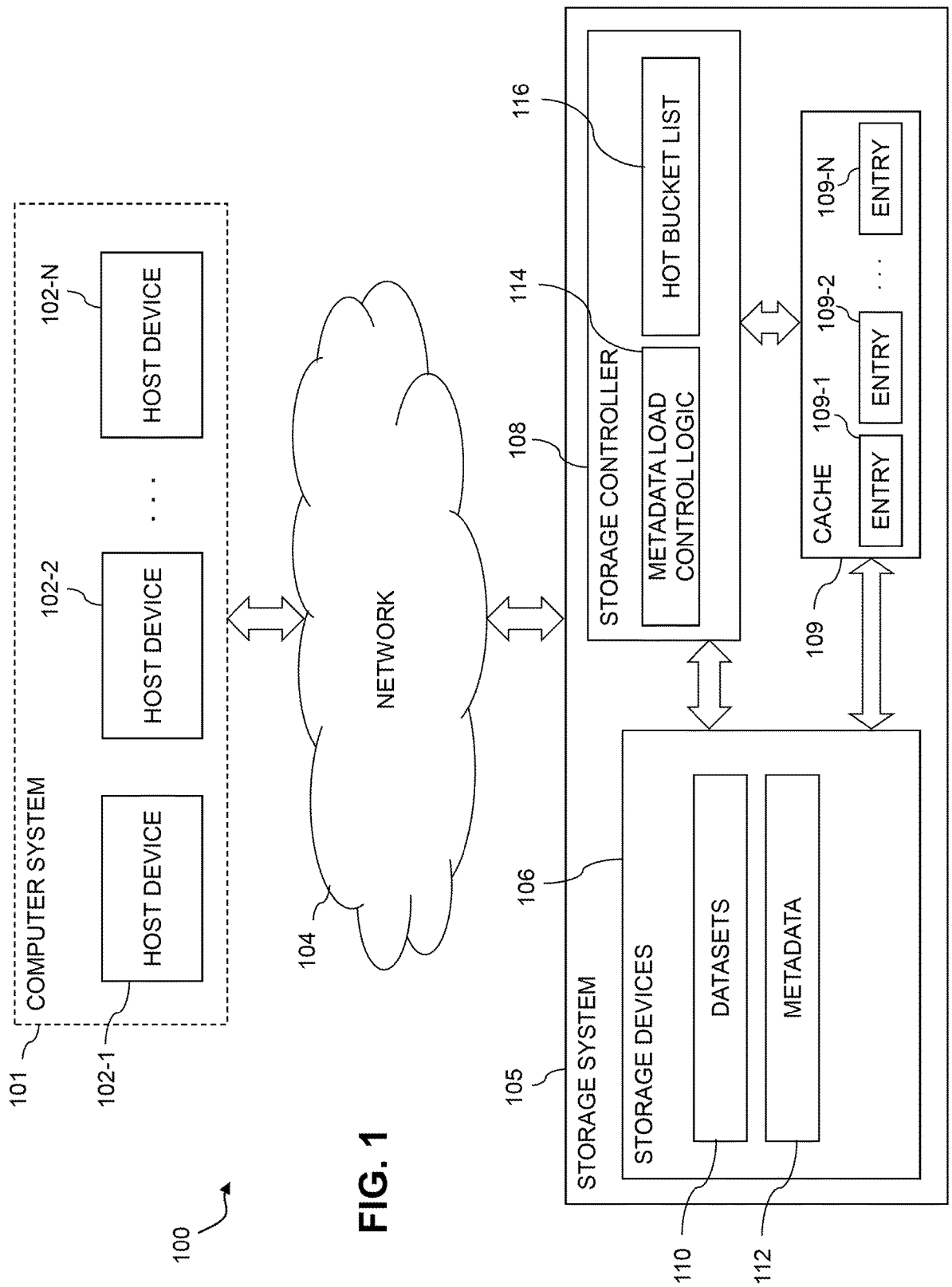
FIG. 1 is a block diagram of an information processing system comprising a storage system configured with functionality for metadata loading control during a storage system reset in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Figure 2:
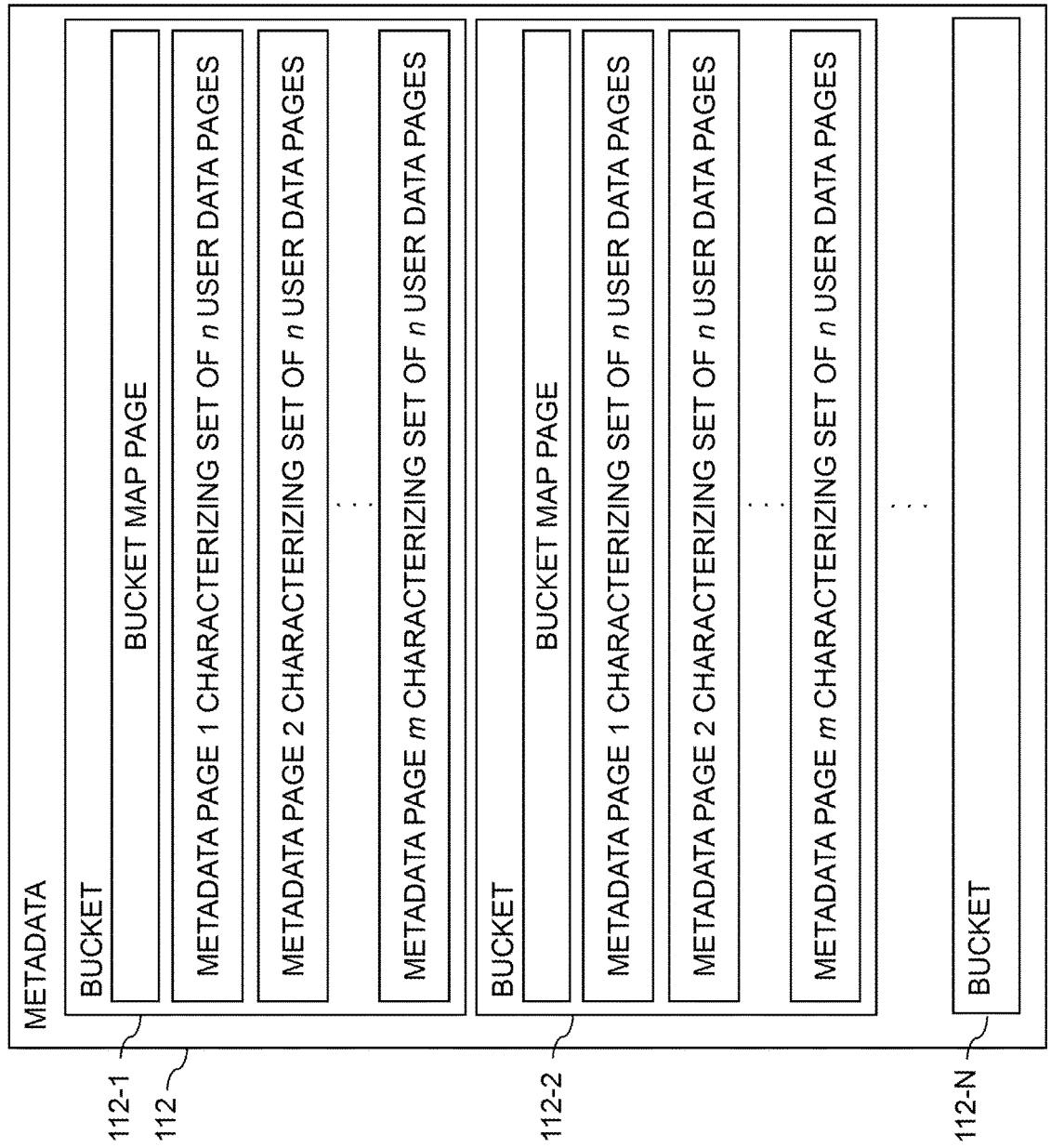
FIG. 2 shows an example of metadata in an illustrative embodiment.

The storage system 105 is accessible to the host devices 102 over the network 104. The storage system 105 comprises a plurality of storage devices 106, an associated storage controller 108, and an associated cache 109. The storage devices 106 store datasets 110 and metadata 112. Datasets 110 may comprise logical storage volumes, snapshots or other arrangements of data. Metadata 112 may comprise data about the datasets 110 that may be used by IO threads servicing IO requests to access the datasets 110. For example, metadata 112 may include mapping or other data that may be used to determine how and where the logical storage volumes, snapshots, or other arrangements of data are stored in storage devices 106, relationships between the logical storage volumes, snapshots, or other arrangements of data, or any other information associated with the datasets 110. In some illustrative embodiments, metadata 112 may be stored in storage devices 106 in physical groups or "buckets", for example, buckets 112-1, 112-2, . . . , 112-N, as illustrated in FIG. 2. Each bucket of metadata 112 may comprise a bucket map page and one or more metadata pages, e.g., pages 1, 2, . . . , m, that each characterize a set of n data pages stored in datasets 110. The bucket map page defines the layout of the bucket of metadata including, for example, which metadata pages exist in the bucket. In some embodiments, the bucket map pages of the buckets may be loaded first in the predetermined order during the background lazy load process.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes metadata load control logic 114. The metadata load control logic 114 is configured to control the loading of metadata 112 from the storage devices 106 into cache 109 during a restart process of the storage system 105, for example, using the processes illustrated in the flow diagrams of FIGS. 3A-3C. The storage controller 108 and storage system 105 should also be understood to include additional modules and other components typically found in conventional implementations of storage controllers and storage systems, although such additional modules and other components are omitted from the figure for clarity and simplicity of illustration.

The cache 109 of storage system 105 in the FIG. 1 embodiment includes cache entries 109-1, 109-2, . . . , 109-N which temporarily store data that is being processed by storage system 105, for example, data associated with write and read IO requests, metadata, or other similar data. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to storage devices 106. In some embodiments, cache 109 may support a variety of operations or functions of storage system 105 including, for example, write cache, read cache, temporary metadata storage, or other similar operations. While illustrated as a separate component of storage system 105, in some embodiments, cache 109 may be included as a component of storage controller 108.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108, cache 109, datasets 110, and metadata 112 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, metadata load control functionality can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The storage controller 108 via its metadata load control logic 114 is configured to load metadata into cache 109 during a storage system restart process. Some situations where the storage system may be restarted include, for example, a failure or fault in the storage system 105, a shutdown in response to a power outage or other external event, hardware or software upgrades and updates to the system, or any other circumstance that may require a restart of a storage system 105.

In some embodiments, a restart process of the storage system 105 may include two phases. In a first phase, various components of the storage system may be brought online, communication connections between various components of the storage system may be established, and other similar processes may occur. In the second phase, metadata is typically read from the storage devices "bucket by bucket" in a predetermined order, parsed, and loaded into the cache for further use. This loading process is sometimes referred to as a "Lazy Load" and may be performed by the storage controller as a background process. In the second phase, while the metadata is being loaded into the cache, IO requests may also be received by the storage system that need to be serviced. In some embodiments, the above described features may alternatively be performed in a single phase or more than two phases. The restart process, as described herein, is intended to include at least the second phase as described above but may include additional phases including, for example, the first phase.

In some storage systems, IO requests are required to be serviced within predetermined hard time constraints. For example, the storage system may be required to provide a reply to a host device within a predefined period of time.

In some cases, for example, a specific IO request may require some metadata that has not yet been loaded into cache by the background loading process. In this case, the processing of the IO request by an IO thread of a storage controller may involve loading the required metadata from the storage devices on demand for use by the specific IO thread. If the loading of required metadata takes a longer time than that required by hard time constraint, i.e., the IO request times out, the IO request is typically aborted and the IO thread sends a busy reply to the host device. Because the loading of the required metadata is tied to the IO request, the metadata loading process by the IO thread is also cancelled. Typically, when the metadata loading process is canceled, any intermediate results of the canceled loading process are lost. In addition, if the same IO request is submitted again by the host device, the storage controller may once again attempt to load the required metadata on demand even though it is highly likely that the IO request will once again time out and the intermediate results will again be lost. This process may occur every time the same IO request is submitted until the background lazy load of the metadata in the predetermined order loads the required metadata for that IO request. This process may result in a significant amount of wasted processing resources at a time when the processing capacity of the storage system may be under heavy usage, e.g., due to all of the processes necessary to both restart the storage system and service new incoming IO requests. This waste is especially exacerbated in cases where the IO request requires the loading of a large metadata bucket containing a large number of metadata pages as such a load requires the use of significant processing resources which would then be wasted.

In many storage systems, the actual working set of data is typically a small portion of the whole set of data, and corresponding metadata, stored in the storage system. Therefore, the "Lazy Load" background loading process, which may simply load the metadata into cache in a predetermined order, often will load metadata buckets that are not required by current IO requests. This lazy loading may consume processing resources that could have otherwise been used to service IO requests received during storage system restart, for example, by loading metadata or other pages associated with the IO requests on demand.

The manner in which functionality for metadata load control provided in the FIG. 1 embodiment will now be described. In some illustrative embodiments, metadata load control functionality is disclosed that addresses the above concerns. The metadata loading control functionality may be implemented by metadata load control logic 114 of the storage controller 108.

According to an illustrative embodiment, when an IO request is received from a host device 102 by the storage controller 108 during a restart of the storage system, the storage controller 108 generates an IO thread to service the IO request. The metadata load control logic 114 may also generate a separate loading thread in association with the IO thread for the purpose of loading the metadata required to service the IO request into cache 109. The IO thread then waits for the generated loading thread to report a complete loading of the required metadata. If the IO thread times out before the loading of the required metadata is complete, the generated loading thread may be detached from the IO thread and the IO thread may transmit a busy response to the host device 102 that submitted the IO request.

Example techniques for managing the synchronization of a primary thread with an associated generated thread and detachment of the generated thread upon time out of the primary thread in a storage system such as storage system 105 are disclosed in U.S. patent application Ser. No. 15/196,472, filed Jun. 29, 2016 and entitled "THREAD MANAGEMENT IN A STORAGE SYSTEM", which is incorporated by reference herein in its entirety.

Detachment of the generated loading thread from the IO thread allows the required metadata to continue to be loaded into the cache 109 by the generated loading thread instead of being lost as described above. In addition, since the loading thread continues, a repeat IO request is more likely to be fulfilled within the hard time constraints. For example, once the loading thread completes or is in progress toward completion for the required metadata, there is a high likelihood that a repeat IO request requiring the same metadata will be fulfilled since that metadata is now stored in the cache 109.

In some illustrative embodiments, if the IO request requires a particular metadata page, e.g., METADATA PAGE 1 (FIG. 2), or a small group of metadata pages, e.g., METADATA PAGES 1 and 2 (FIG. 2), that are included in a particular bucket of metadata 112, e.g., bucket 112-1, in the storage devices 106, the required metadata page or pages may be loaded "on Demand" directly by the IO thread servicing the IO request. In addition, a loading thread may be generated in association with the IO thread and may mark the bucket, e.g., bucket 112-1, including the required metadata page or pages as HOT and may add the bucket to a hot bucket list 116 of storage controller 108 for priority, e.g., "out of order", loading by the background Lazy Load threads. For example, the generated loading thread may mark the bucket as HOT and add the bucket to the hot bucket list 116 even though the IO thread is handling the on demand loading of the particular metadata page or pages.

This ensures that even if the IO thread fails or times out, for example, because the "on demand" loading of the particular metadata page or pages by the IO thread takes longer than the predefined period of time specified by the hard time constraint for the IO thread, the bucket containing those pages is still loaded into the cache 109 with priority, e.g., due to its status as a HOT bucket and inclusion in the hot bucket list 116. If the IO request is repeated, it is likely that the bucket containing the particular metadata page or pages is either in progress or already loaded into cache 109.

In some illustrative embodiments, for example, the background Lazy Load process may be configured to load any buckets contained in the hot bucket list 116 before loading buckets in the predetermined order. For example, in some embodiments, the Lazy Load process may be configured to load the buckets in the hot bucket list 116 in a first in first out (FIFO) order. Other orders of loading from the hot bucket list may also be used including, for example, first in last out (FILO) or any other order of loading the hot buckets. If the hot bucket list 116 does not include any buckets to be priority loaded, the Lazy Load process may load the next bucket in the predetermined order, assuming that the next bucket was not already loaded, e.g., by an earlier priority load.

Often a metadata bucket may have a certain locality meaning where, for example, all or most of the metadata pages of a bucket may relate to the same volume/LUN of the storage system 105. The receipt of an IO request related to a page of metadata stored in a bucket therefore may be an indication that the bucket contains metadata related to the current working set of data and that there is an increased likelihood that the storage system will receive additional IO requests related to metadata pages stored in this bucket. By also prioritizing loading of the full bucket even when the IO request only requires a metadata page or small group of metadata from that bucket, an additional benefit may be realized For example, any additional IO requests related to the current working set will likely target the same bucket and therefore will not require a separate loading of metadata pages or buckets from storage devices 106 to cache 109, since the pages of the bucket will have already been loaded in a prioritized manner by the background loading threads.

The following describes an illustrative embodiment of metadata load control functionality.

Each bucket may include a load state such as, e.g., UNLOADED, IN_PROGRESS, LOADED.

In the UNLOADED state, the bucket has not yet been loaded from storage devices 106 into cache 109 either by the background Lazy Load process in the predetermined order or by prioritized loading.

In the IN_PROGRESS state, the bucket is currently in the process of being loaded from the storage devices 106 into cache 109.

In the LOADED state, the load of the bucket from the storage devices 106 into cache 109 has been completed.

In some illustrative embodiments, for example, metadata load control logic 114 may implement the same bucket loading function to load buckets for both prioritized loading and background Lazy Loading in the predetermined order. For example, a bucket loading function may be used which may load buckets "On Demand", i.e., by loading threads generated by the storage controller 108 in association with an IO thread processing the IO request, and "Lazy Load", i.e., from background Lazy Load threads that load the buckets in the predetermined order. In some embodiments, separate functions may be implemented by metadata load control logic 114 for each of the "On Demand" and "Lazy Load" processing. The bucket loading function may be executable by both the loading threads and IO threads as needed.

The bucket loading function obtains or reads the bucket load state to determine what action to take for a given bucket to be loaded, e.g., the next bucket requiring prioritized loading from the hot bucket list 116, or if the hot bucket list 116 does not include any buckets, next bucket in the predetermined order. In some embodiments, buckets may be loaded from both the hot bucket list 116 and in the predetermined order at the same time. For example, if multiple threads are operating concurrently, and only one bucket is listed in the hot bucket list 116, one thread may execute loading of the bucket from the hot bucket list 116 "On Demand" while any remaining threads may load buckets according to the predetermined order under the "Lazy Load" logic. In some embodiments, the bucket load state may be stored, for example, in volatile memory such as, e.g., cache 109 or in any other volatile memory as described above with respect to the cache 109. In some embodiments, the bucket load state may be stored in non-volatile memory as described above with reference to storage devices 106.

If the bucket load state is LOADED, for example, the bucket loading function may simply complete and return an indication of a successful load.

If the bucket load state is UNLOADED, for example, the bucket loading function may change the load state of the bucket to IN_PROGRESS and begin loading the bucket into cache 109. When the loading is completed, the bucket loading function may change the bucket load state to LOADED and perform the action above for a bucket having the LOADED state, e.g., complete and return an indication of a successfully load.

If the bucket load state is IN_PROGRESS, e.g. the bucket is already being processed and loaded by another thread, the bucket loading function waits for the bucket load state to be changed to LOADED by the other thread. Once the bucket load state is changed to LOADED, the bucket loading function may perform the action above for a bucket having the LOADED state, e.g., complete and return an indication of a successfully load.

Thus, in some illustrative embodiments, the bucket loading function may ensure that no buckets are double processed for loading into cache, e.g., by both the "On Demand" prioritized loading and background "Lazy Load" in the predetermined order.

In some illustrative embodiments, the metadata load control logic 114 may implement a bucket loading function similar to the following pseudocode logic for loading buckets into cache:

```
CurrentBucket = 0
While (CurrentBucket < NumberOfBuckets)
{
    If (HOT_BUCKET_LIST is not empty)
        Take the HotBucket from the HOT_BUCKET_LIST;
        Load_Bucket (HotBucket);
    Else
        Load_Bucket (CurrentBucket);
        CurrentBucket++;
}
```

The above metadata loading control logic 114 guarantees that buckets found in the hot bucket list are always loaded first with high priority and that all of the buckets will eventually be loaded into the cache 109 independent of whether a bucket was added to the hot bucket list 116 and loaded with prioritized loading. By using bucket load states to determine the appropriate action, as described above, metadata load control logic 114 may also guarantee that no bucket will be loaded twice.

Figure 3A:
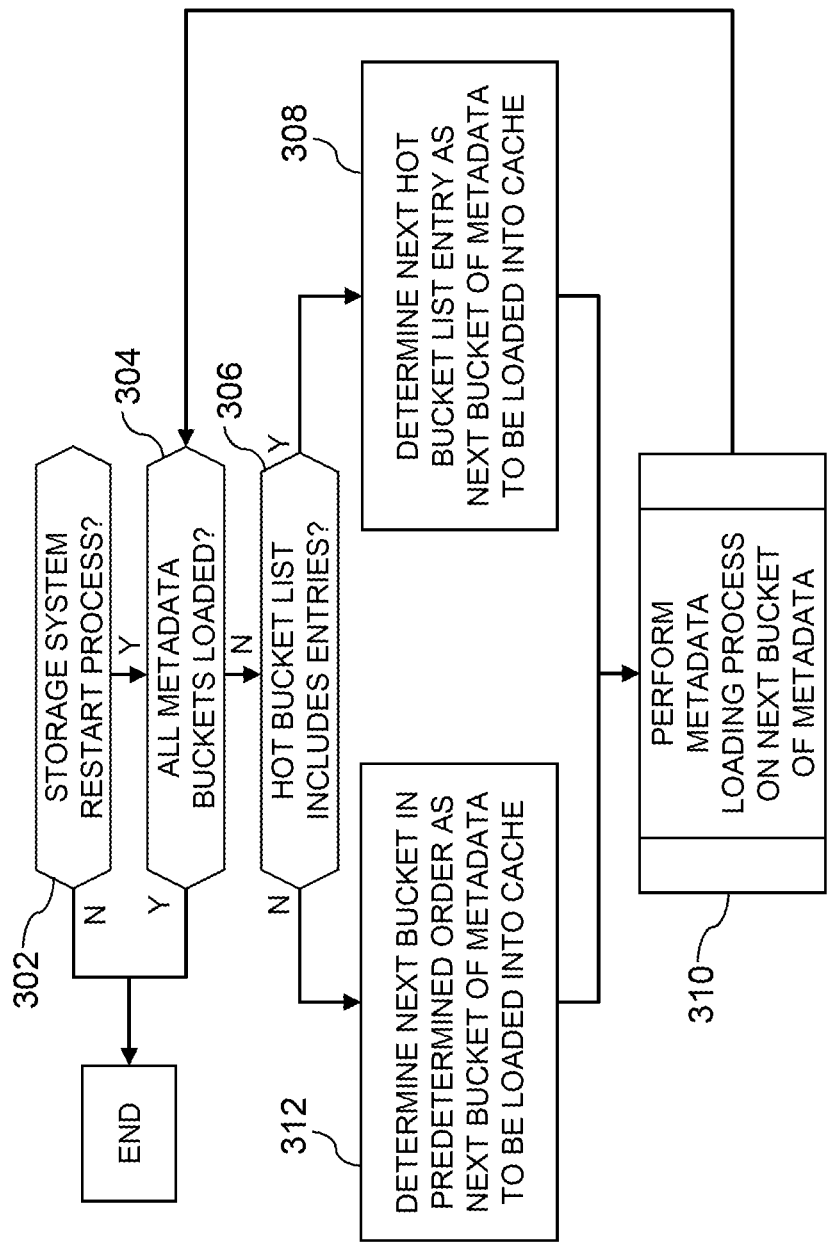
FIGS. 3A-3C are flow diagrams of portions of a process for metadata loading control during a storage system reset in an illustrative embodiment.
Figure 3B:
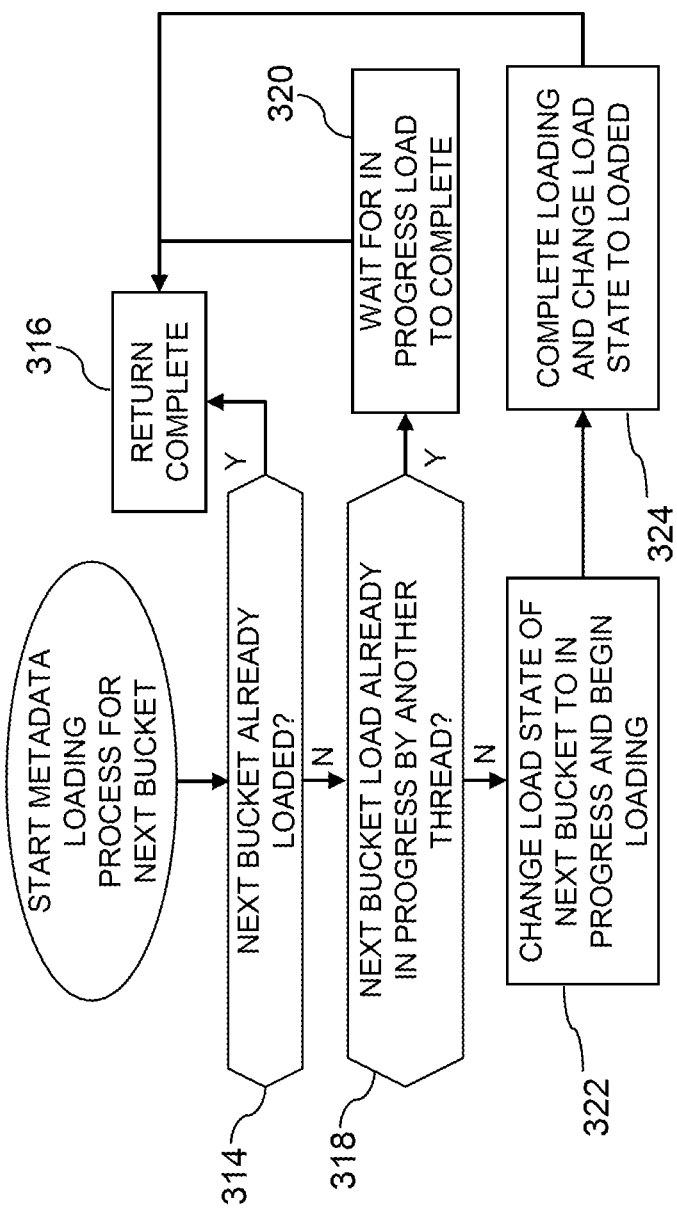
Figure 3C:
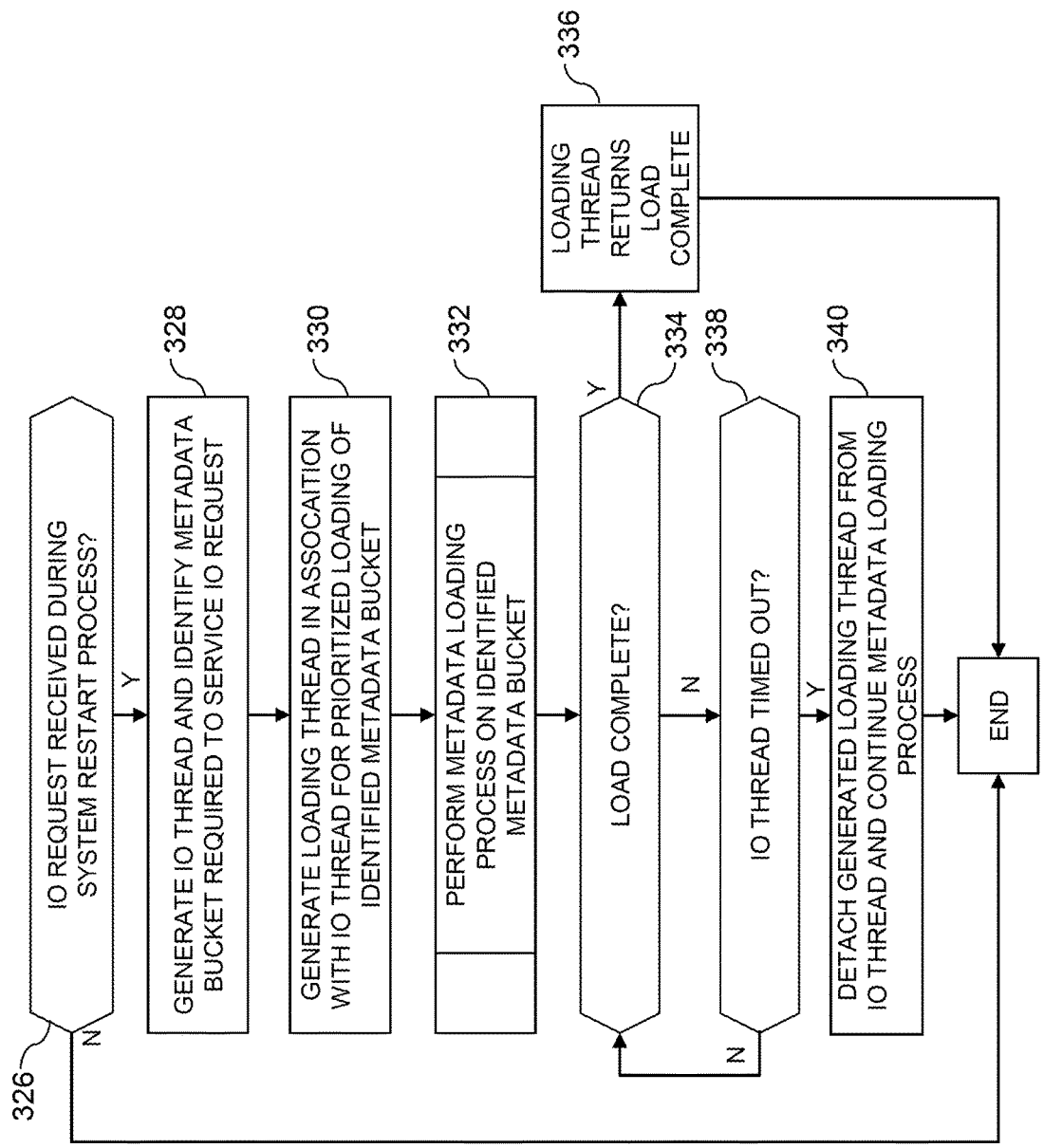

The operation of the information processing system 100 will now be described in further detail with reference to the flow diagrams of the illustrative embodiment of FIGS. 3A-3C. The process as shown in FIG. 3A includes steps 302 through 312 and illustrates the background "Lazy Load" logic performed by storage controller 108 during a system restart process, the process as shown in FIG. 3B includes steps 314 through 324 and illustrates the bucket load logic described above, and the process as shown in FIG. 3C includes steps 326 through 340 and illustrates the logic performed by the storage controller 108 when an IO request is received during the system restart process. The processes of FIGS. 3A-3C are suitable for use in system 100 but is more generally applicable to other types of information processing systems in which a storage system is configured to load metadata from storage devices 106 into cache 109 during a system restart process. The steps are illustratively performed at least in part under the control of the metadata load control logic 114 implemented by storage controller 108 in storage system 105 of system 100. While illustrated and described with reference to metadata buckets, the processes illustrated in FIGS. 3A-3C may also or alternatively be performed for individual or groups of metadata pages, or any other unit or size in which metadata may be stored and loaded.

With reference now to FIG. 3A, the background "Lazy Load" processing during a system restart process will now be described.

In step 302, the storage controller 108 determines whether a storage system restart process is being performed. For example, storage controller 108 may check a flag or other indication of the storage system 105 that may be used to signify that the storage system 105 is currently being restarted. If the storage controller 108 determines that a storage system restart process is not being performed, the process ends.

In step 304, if the storage controller 108 determines that a storage system restart process is being performed, the storage controller 108 determines whether all metadata pages have been loaded into cache 109 from storage devices 106. If the storage controller 108 determines that all metadata pages have been loaded into cache 109, the process ends. In some embodiments, the determination of whether a storage system restart process is being performed may simply be a determination by storage controller 108 of whether all metadata pages have been loaded from storage devices 106 into cache 109. For example, by determining that all of the metadata pages have been loaded into the cache 109, the storage controller 108 may also determine that a storage system restart process is not being performed and end.

In step 306, if the storage controller 108 determines that all metadata pages have not yet been loaded into cache 109, the storage controller 108 determines whether a hot bucket list, e.g., hot bucket list 116 described above, includes any entries that require prioritized loading.

In step 308, if the hot bucket list includes any entries, the storage controller 108 determines the next entry in the hot bucket list as the next bucket of metadata to be loaded into cache 109. For example, the next entry may be the entry at the head of the hot bucket list 116, e.g., in a first in first out order.

In step 310, storage controller 108 performs the metadata loading process of FIG. 3C on the determined next bucket.

Referring back to step 306, if the hot bucket list does not include any entries, the storage controller 108 determines the next bucket in the predetermined order as the next bucket of metadata to be loaded into cache 109 at step 312 and proceeds to step 310 as described above.

With reference now to FIG. 3B, the logic for implementing the metadata loading process on the next bucket, e.g., the bucket load functionality described above, will now be described.

In step 314, the storage controller 108 determines whether the next bucket is already loaded into cache 109. For example, the load state of the next bucket may be checked by the storage controller 108 to determine whether the next bucket has already been loaded. For example, if the load state is LOADED, the storage controller 108 may determine that the next bucket is already loaded into cache 109. If the next bucket is already loaded into cache 109, the storage controller 108 returns an indication of a completed load in step 316.

In step 318, if the next bucket is not already loaded into cache 109, the storage controller 108 may determine whether loading of the next bucket is in progress by another thread of the storage controller 108. For example, the storage controller 108 may check the state of the next bucket to determine whether the state is IN_PROGRESS.

In step 320, if the loading of the next bucket is in progress by another thread, the storage controller 108 may wait until the other thread completes the loading, e.g., changes the load state to LOADED. In response to the load state of the next bucket being changed to LOADED by the other thread, the storage controller 108 returns an indication of a completed load in step 316.

If the loading of the next bucket is not already in progress, e.g., the load state is UNLOADED, the storage controller 108 begins loading of the next bucket in step 322. For example, the storage controller 108 may set the load state of the next bucket to IN_PROGRESS and commence loading of the next bucket.

In step 324, storage controller 108 completes loading of the next bucket and changes the load state of the next bucket to LOADED. The storage controller 108 then returns an indication of a completed load in step 316.

With reference now to FIG. 3C, the logic performed by the storage controller 108 when an IO request is received during the system restart process will now be described.

At step 326, the storage controller 108 determines whether an IO request has been received, e.g., from a host device, during a system restart process.

At step 328, if an IO request has been received, the storage controller 108 generates an IO thread to service the IO request and identifies the metadata buckets that are required to service the IO request, for example, by reading the content of the IO request. In some embodiments, for example, content-based signatures associated with the IO request may be used to determine which metadata buckets are required to service the IO request. In some embodiments, when an IO request is received from a host device, an IO thread is activated or tasked by storage controller 108 to service the IO request.

At step 330, a loading thread is generated in association with the IO thread for prioritizing loading of the identified metadata bucket. In some illustrative embodiments, the generated loading thread is detachable from the IO thread such that, in response to an expiration or time out of the IO thread, the loading thread may be detached from the expired IO thread and may continue the process of loading the identified metadata page or bucket into the cache 109. In some embodiments, the loading thread may be detached from the IO thread prior to expiration of the IO thread.

At step 332, the loading thread causes execution of the metadata loading process by the storage controller 108 on the identified metadata bucket.

At step 334, the loading thread determines whether the loading of the identified metadata bucket is complete, e.g., has an indication of a completed load been received from the metadata loading process.

At step 336, if the loading thread determines that the load of the identified metadata bucket has completed, the loading thread returns an indication of the completed loading of the identified metadata bucket to the IO thread. The process then ends.

At step 338, if the loading thread determines that the loading of the identified metadata bucket is not complete, the loading thread determines whether the IO thread has timed out. In some embodiments, determining whether the IO thread has timed out may comprise the loading thread receiving an indication that the IO thread has timed out. In some embodiments, the loading thread may actively check whether the IO thread has timed out. The IO thread may time out, for example, if the loading of the identified metadata page or bucket exceeds the predetermined hard time constraint for that IO thread. Example techniques for determining whether the IO thread, e.g., an IO caller thread, has timed out by a generated loading thread, e.g., a background provider thread, is disclosed in U.S. patent application Ser. No. 15/196,472, mentioned above. If the IO thread has not timed out, the process returns to step 334 and determines whether the load is complete.

At step 340, if the IO thread has timed out at step 338, in some embodiments, the loading thread is detached from the IO thread, for example, in the manner described in U.S. patent application Ser. No. 15/196,472, mentioned above. The IO thread returns a busy indication to the host device 102 and the loading thread continues with the loading of the identified metadata bucket according to the metadata loading process. For example, when loading of the identified metadata bucket is completed, the loading thread may wake up, check the load state of the bucket, determine that the load state is LOADED, and complete. In some embodiments, when the identified metadata bucket was already in progress and being loaded by another thread, the loading thread may not detach and may instead time out and cancel along with the IO thread. The process then ends.

The particular processing operations and other system functionality described in conjunction with the flow diagrams of FIGS. 3A-3C are presented by way of illustrative example only and should not be construed as limiting the scope of the disclosure in any way. Alternative embodiments can use other types of processing operations for metadata loading control during a storage system reset. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different metadata loading control processes or for different storage systems or portions thereof within a given information processing system.

Functionality such as that described in conjunction with the flow diagrams of FIGS. 3A-3C can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 108 that is configured to control performance of one or more steps of the processes of FIGS. 3A-3C in its corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host device 102 or the storage controller 108 of system 100, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate metadata loading control techniques as disclosed herein.

An illustrative embodiment of such a content addressable storage system will now be described with reference to FIG. 4. In this embodiment, a content addressable storage system 405 comprises a plurality of storage devices 406, an associated storage controller 408, and an associated cache 409. The content addressable storage system 405 may be viewed as a particular implementation of the storage system 105, and accordingly is assumed to be coupled to host devices 102 of computer system 101 via network 104 within information processing system 100.

The storage controller 408 in the present embodiment is configured to implement metadata load functionality of the type previously described in conjunction with FIGS. 1 through 3C.

The storage controller 408 includes metadata load control logic 414 and hot bucket list 416, which is configured to operate in a manner similar to that described above for metadata load control logic 114 and hot bucket list 116.

The cache 409 is similar to cache 109 and includes cache entries 409-1, 409-2, ..., 409-N that are similar to cache entries 109-1, 109-2, ..., 109-N. Cache 409 is configured to operate in a manner similar to that described above for cache 109. While illustrated as a component of storage nodes 415, in some embodiments, cache 409 may be included as a component of storage controller 408. In some embodiments, the caches 409 of each storage node 415 may operate together as a single cache 409 of the content addressable storage system 405 where the components of a given storage node 415 may access any portion of the cache 409 including those portions included as components of other storage nodes 415.

Figure 4:
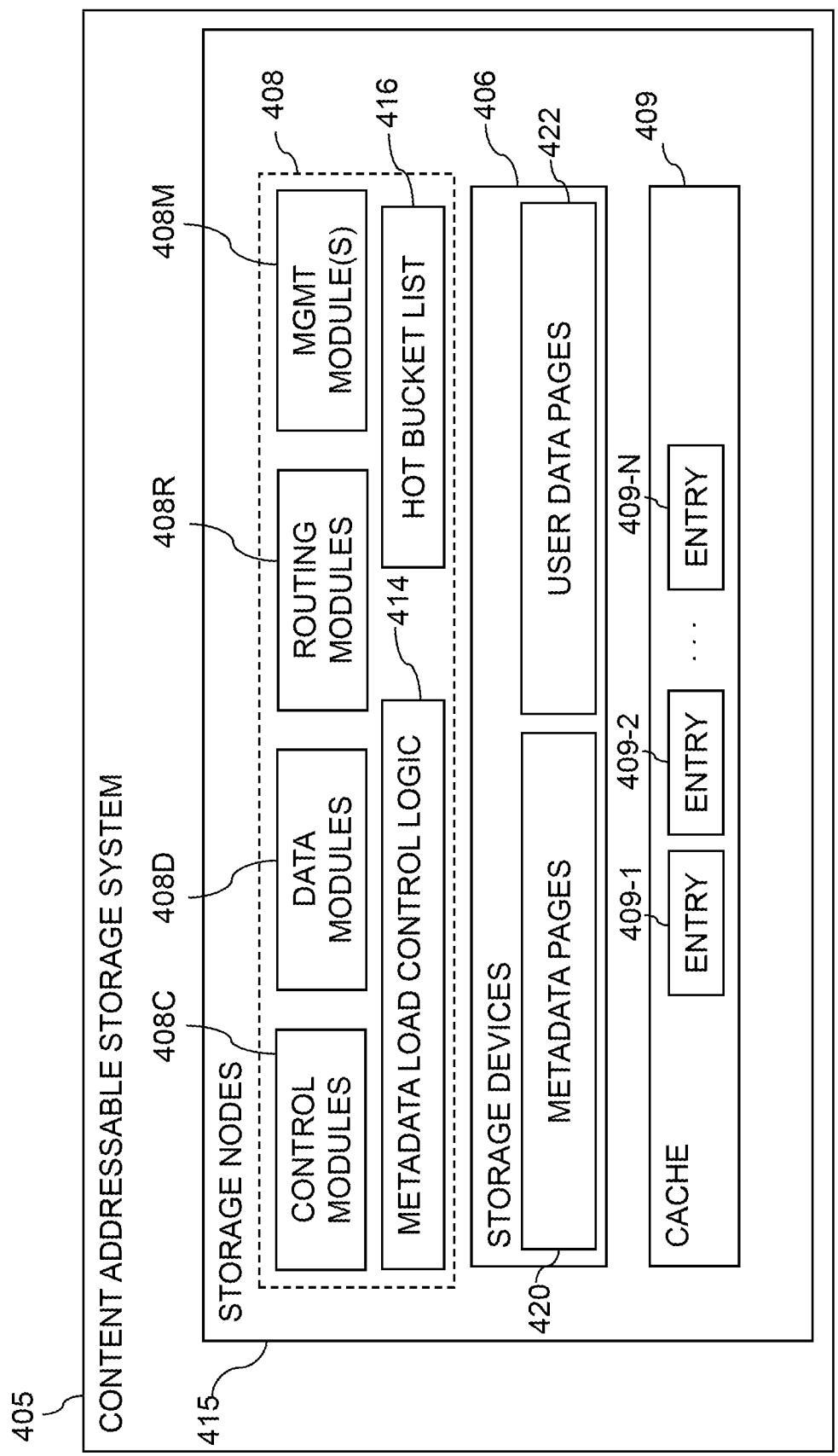
FIG. 4 shows a content addressable storage system having a distributed storage controller configured with functionality for metadata loading control during a storage system reset in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as a separate module of the distributed storage controller 408, the metadata load control logic 414 in the present embodiment is assumed to be distributed at least in part over at least a subset of the other modules 408C, 408D, 408R and 408M of the storage controller 408. Accordingly, at least portions of the metadata load control functionality of the metadata load control logic 414 may be implemented in one or more of the other modules of the storage controller 408. In other embodiments, the metadata load control logic 414 may be implemented as a stand-alone module of the storage controller 408.

The storage devices 406 are configured to store metadata pages 420 and user data pages 422 and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 422 can include any type of user data that may be utilized in the system 100. The term "user data" herein is therefore also intended to be broadly construed.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. It should be noted that usage of the variable n in this user data page context is unrelated to its usage elsewhere herein in the content of an n-bit CRC.

Each of the user data pages 422 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 5:
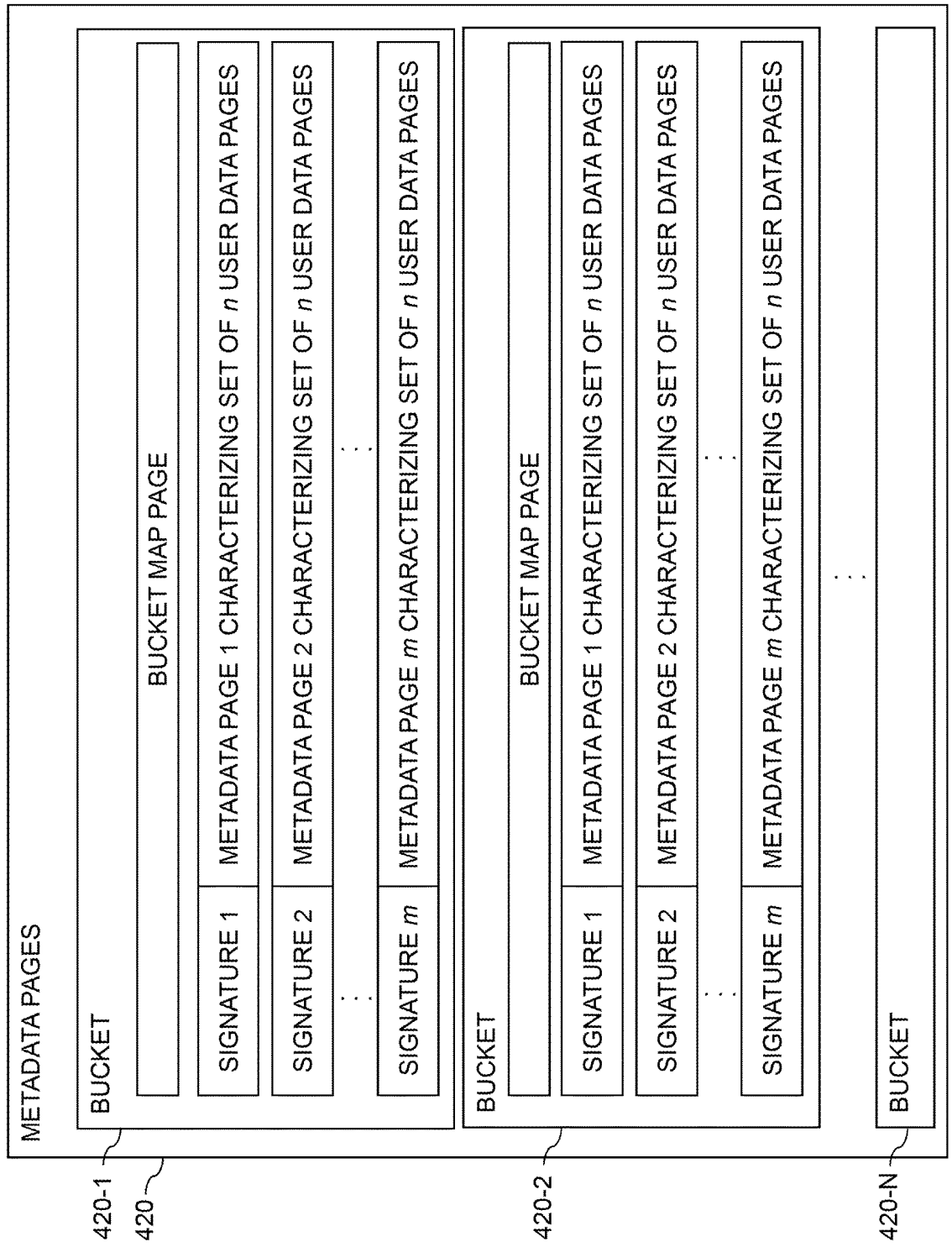
FIG. 5 shows an example of metadata in a content addressable storage system in an illustrative embodiment.

As illustrated in FIG. 5, for example, a given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. In some illustrative embodiments, the given set may be stored in buckets, e.g., bucket 420-1, bucket 420-2, . . . bucket 420-N, in a similar manner to buckets 112-1, 112-2, . . . 112-N as described above with reference to metadata 112. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The metadata load control functionality provided by metadata load control logic 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include metadata load control logic 414 that engages corresponding metadata load control logic 414 instances in all of the control modules 408C and routing modules 408R in order to implement a metadata load process.

In some embodiments, the content addressable storage system 405 comprises an XtremIO™ storage array suitably modified to incorporate techniques for loading metadata into cache during a storage system restart process as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, metadata load control functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the host devices 102. In some embodiments, a write request is received in the distributed storage controller 408 of the storage system 405 and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash-to-physical ("H2P") table, sometimes known as a hash metadata ("HMD") table, with the A2H and H2P tables corresponding to respective logical and physical layers of the content-based signature mapping within the storage system 405.

The first level of mapping using the A2H table associates logical addresses of respective data pages with respective content-based signatures of those data pages. This is also referred to as logical layer mapping.

The second level of mapping using the H2P table associates respective ones of the content-based signatures with respective physical storage locations in one or more of the storage devices 406. This is also referred to as physical layer mapping.

For a given write request, both of the corresponding H2P and A2H tables are updated in conjunction with the processing of that write request. For example, the A2H table may be updated when the page data for the write request is stored in cache 109 and the H2P table may be updated when the page data is hardened to storage devices 106 during a destaging process.

The A2H and H2P tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released. While zero is used to indicate that there are no longer any logical blocks that reference the corresponding physical block in the illustrative embodiment, any other predetermined value may be used.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement metadata load control functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with metadata load control functionality as disclosed herein can provide a number of significant advantages relative to conventional arrangements.

For example, the metadata load control functionality as disclosed herein provides ways to prioritize the loading of metadata pages or buckets that are required to service current IO requests while the storage system is undergoing a restart process. For example, metadata pages or buckets required by current IO requests are prioritized and loaded before metadata pages or buckets that are loaded according to the predetermined order. This allows IO requests received during a storage system restart to be serviced faster and more efficiency by allocating computer resources to load the metadata pages and buckets that are currently targeted for use by users of the storage system instead of simply loading the metadata pages and buckets in a predetermined order.

As another example, by providing a detachable loading thread which continues even if the original IO thread times out, the metadata load control functionality improves the efficiency of the storage system by ensuring that computing resources are not being wasted discarding partially loaded buckets of metadata when a pending IO thread times out. Instead, the processing effort involved in loading the metadata pages or buckets to service a particular IO request may be preserved by completing the load even after time out.

As a further example, where previously the same metadata page or bucket would be repeatedly partially loaded and discarded when the same IO request was received and timed out, the disclosed metadata load control functionality ensures that a single load of the metadata page or bucket is performed to completion and that no bucket is double processed, thereby reducing the amount of wasted processing resources.

As a further example, even with prioritized loading of some metadata pages or buckets to service current IO requests, all remaining pages or buckets are still loaded in the predetermined order by the background "Lazy Load" process without duplicate processing of the priority loaded buckets which reduces the amount of wasted processing resources and improves the efficiency of the system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with metadata loading control functionality will now be described in greater detail with reference to FIGS. 6 and 7. Although described in the context of system 100, these platforms may also be used to implement at least portions of other information processing systems in other embodiments.

Figure 6:
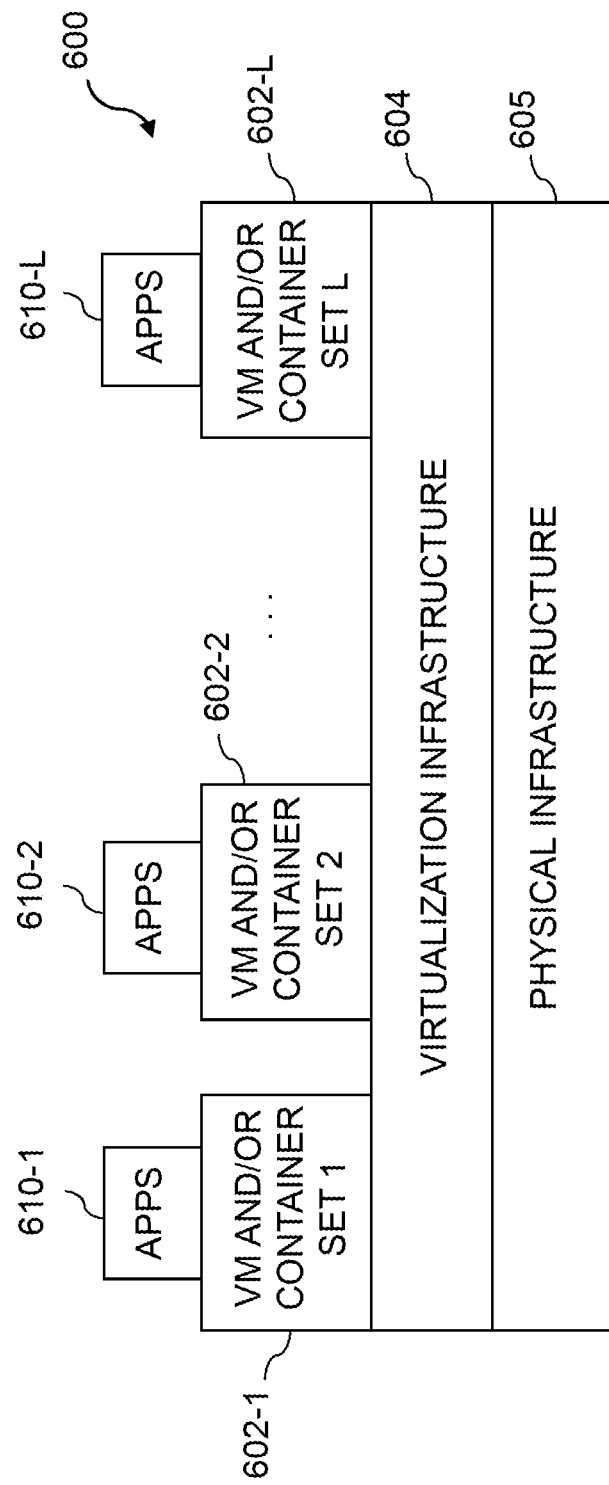
FIGS. 6 and 7 show examples of processing platforms that may be utilized to implement at least a portion of an information processing system in illustrative embodiments.
Figure 7:
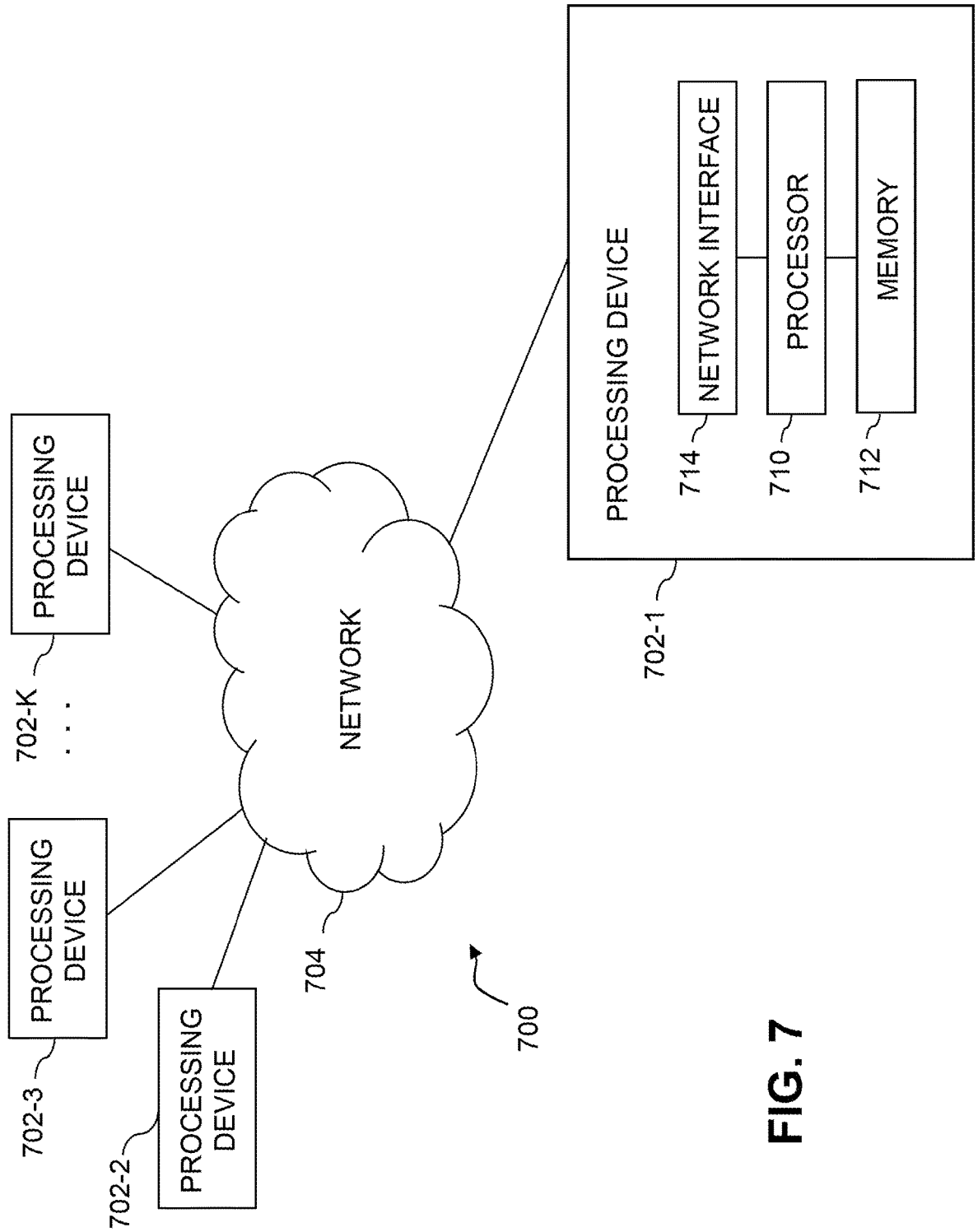

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide metadata loading control functionality of the type described above for one or more processes running on a given one of the VMs. For example, each of the VMs can implement metadata loading control functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide metadata load control functionality of the type described above for one or more processes running on different ones of the containers. For example, a container host device supporting multiple containers of one or more container sets can implement one or more instances of metadata load control logic for use in loading metadata into cache during a restart process.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the metadata load control functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, metadata load control processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices, an associated storage controller, and an associated cache, the plurality of storage devices storing data pages and metadata associated with the stored data pages;
the storage controller being configured to, during a restart process in which the metadata is loaded from at least one of the storage devices into the cache:
generate an input/output (IO) thread in response to a receipt of an IO request, the IO thread configured to service the IO request;
identify at least one metadata page of the metadata that is used to service the IO request; and
generate a loading thread in association with the IO thread, the loading thread configured to cause the storage controller to perform prioritized loading of the identified at least one page of the metadata into the cache, the loading thread being detachable from the IO thread such that, in response to an expiration of the IO thread, the loading thread continues to cause the storage controller to perform the prioritized loading of the at least one page of the metadata into the cache until the loading of the at least one page of the metadata into the cache is complete,
wherein the storage controller comprises at least one processing device comprising a processor coupled to a memory.

2. The apparatus of claim 1, wherein the loading thread is detached from the IO thread in response to the IO thread timing out before the loading of the at least one metadata page into the cache is complete.

3. The apparatus of claim 1, wherein the metadata is stored in the storage devices as a plurality of buckets of metadata pages, the storage controller configured to, during the restart process, load the metadata into the cache bucket by bucket in a predetermined order, the storage controller configured to perform the prioritized loading of the at least one page of the metadata out of order of the predetermined order.

4. The apparatus of claim 3, wherein causing the storage controller to perform prioritized loading of the at least one page of the metadata comprises causing the storage controller to perform prioritized loading of the bucket containing the at least one page of the metadata.

5. The apparatus of claim 4, wherein causing the storage controller to perform prioritized loading of the bucket containing the at least one page of the metadata comprises causing the storage controller to add the bucket containing the at least one page of the metadata to a hot list of buckets, the hot list of buckets comprising a list of buckets that have been marked for prioritized loading.

6. The apparatus of claim 5, wherein the storage controller is further configured perform prioritized loading of each of the buckets added to the hot list of buckets before loading any remaining unloaded buckets of the metadata into the cache in the predetermined order.

7. The apparatus of claim 3, wherein causing the storage controller to perform prioritized loading of the at least one page of the metadata comprises causing the storage controller to:
load the at least one page of the metadata on demand; and
mark the bucket containing the at least one page of the metadata for further prioritized loading.

8. The apparatus of claim 3, wherein the storage controller is further configured to:
determine a next bucket to be loaded, the next bucket to be loaded being a bucket requiring priority loading or, if no buckets require priority loading, the bucket that is next in the predetermined order;
determine a load state of a next bucket; and
perform loading of the next bucket based on the determined load state.

9. The apparatus of claim 8, wherein in response to determining that the load state of the next bucket is in progress, the storage controller is further configured to perform loading of the next bucket based on the determined state by waiting until the in progress loading of the next bucket is complete.

10. The apparatus of claim 8, wherein in response to determining that the load state of the next bucket is unloaded, the storage controller is further configured to perform loading of the next bucket based on the determined state by changing the state of the next bucket to in progress and performing loading of the next bucket into the cache until the loading of the next bucket is completed.

11. The apparatus of claim 10, wherein in response to completion of the loading of the next bucket, the storage controller is further configured to change the load state of the next bucket to loaded.

12. The apparatus of claim 8, in response to determining that the load state of the next bucket is loaded, the storage controller is configured to determine the next bucket to be loaded into the cache.

13. A method performed during a restart process of a storage system in which metadata is loaded from at least one of a plurality of storage devices into a cache, the method comprising:

generating an input/output (IO) thread in response to a receipt of an IO request, the IO thread configured to service the IO request;

identifying at least one metadata page of the metadata that is used to fulfill the IO request; and generate a loading thread in association with the IO thread, the loading thread configured to cause the storage system to perform prioritized loading of the identified at least one page of the metadata into the cache, the loading thread being detachable from the IO thread such that, in response to an expiration of the IO thread, the loading thread continues to cause the storage system to perform the prioritized loading of the at least one page of the metadata into the cache until the loading of the at least one page of the metadata into the cache is complete;

wherein the method is implemented by at least one processing device comprising a processor coupled to a memory.

14. The method of claim 13, wherein the loading thread is detached from the IO thread in response to the IO thread timing out before the loading of the at least one metadata page into the cache is complete.

15. The method of claim 13, wherein the metadata is stored in the storage devices as a plurality of buckets of metadata pages, the method further comprising, during the restart process, causing the storage system to perform loading of the metadata into the cache bucket by bucket in a predetermined order, the prioritized loading of the at least one page of the metadata being performed out of order of the predetermined order.

16. The method of claim 15, wherein causing the storage system to perform prioritized loading of the at least one page of the metadata comprises causing the storage system to perform prioritized loading of the bucket containing the at least one page of the metadata.

17. The method of claim 16, wherein causing the storage system to perform prioritized loading of the bucket containing the at least one page of the metadata comprises causing the storage system to add the bucket containing the at least one page of the metadata to a hot list of buckets, the hot list of buckets comprising a list of buckets that have been marked for prioritized loading, and wherein the method further comprises causing the storage system to perform prioritized loading of each of the buckets added to the hot list of buckets before loading any remaining unloaded buckets of the metadata into the cache in the predetermined order.

18. The method of claim 15, wherein causing the storage system to perform prioritized loading of the at least one page of the metadata comprises causing the storage system to:

load the at least one page of the metadata on demand; and mark the bucket containing the at least one page of the metadata for further prioritized loading.

19. A computer program product comprising a non-transitory processor-readable storage medium having stored therein program code of one or more software programs, wherein the program code when executed by at least one processing device causes said at least one processing device to, during a restart process of a storage system in which metadata is loaded from at least one of a plurality of storage devices into a cache: generate an input/output (IO) thread in response to the receipt of an IO request, the IO thread configured to service the IO request; identify at least one metadata page of the metadata that is used to fulfill the IO request; and generate a loading thread in association with the IO thread, the loading thread configured to cause the storage system to perform prioritized loading of the identified at least one page of the metadata into the cache, the loading thread being detachable from the IO thread such that, in response to an expiration of the IO thread, the loading thread continues to cause the storage system to perform the prioritized loading of the at least one page of the metadata into the cache until the loading of the at least one page of the metadata into the cache is complete.

20. The computer program product of claim 19, wherein the loading thread is detached from the IO thread in response to the IO thread timing out before the loading of the at least one metadata page into the cache is complete.

* * * * *